United States Patent [19]
Aoki et al.

[11] Patent Number: 4,986,631
[45] Date of Patent: Jan. 22, 1991

[54] AUTOMOTIVE DISPLAY SYSTEM

[75] Inventors: Kunimitsu Aoki; Yasuhiro Miyazawa; Hiroshi Ichikawa; Yoshiyuki Furuya, all of Susono, Japan

[73] Assignee: Yazaki Corporation, Tokyo, Japan

[21] Appl. No.: 548,522

[22] Filed: Jul. 5, 1990

[30] Foreign Application Priority Data

Jul. 17, 1989 [JP] Japan ............................ 1-083024
Feb. 13, 1990 [JP] Japan ......................... 2-011931[U]

[51] Int. Cl.$^5$ ............................................ G02B 17/04
[52] U.S. Cl. .................................... 350/112; 350/286; 350/602; 350/618
[58] Field of Search ............... 350/112, 113, 170, 171, 350/173, 286, 287, 321, 421, 445, 446, 497, 574, 601, 602, 618

[56] References Cited

U.S. PATENT DOCUMENTS 3,650,599  3/1972  Pederson .
4,931,959  6/1990  Brenner et al. .

Primary Examiner—Bruce Y. Arnold
Assistant Examiner—J. P. Ryan
Attorney, Agent, or Firm—Armstrong, Nikaido, Marmelstein, Kubovcik & Murray

[57] ABSTRACT

An automotive display system for a vehicle comprises a display having a display screen, a reflecting mirror disposed with its reflecting surface facing the display screen of the display, and a prism disposed between the display and the reflecting mirror. Light rays emanated from the display enter the prism through a first surface of the prism, are transmitted through the prism and fall on the reflecting surface of the reflecting mirror and are reflected by the reflecting mirror. The light rays reflected by the reflecting mirror travel along a path coinciding with or nearly coinciding with the path of travel of the light rays incident on the reflecting surface of the reflecting mirror and are reflected again by the second surface of the prism toward the driver's eye. The light rays travel from the second surface of the prism to and from the reflecting mirror through a comparatively long optical path in a relatively small space for effective remote displaying. Thus, the automotive display system can be formed in a compact construction.

4 Claims, 5 Drawing Sheets

AUTOMOTIVE DISPLAY SYSTEM

BACKGROUND OF THE INVENTION

1. Field of the Invention

The present invention relates to an automotive display system for displaying driving information for the driver on the instrument panel of a vehicle.

2. Description of the Prior Art

FIGS. 7 and 8 show conventional automotive display systems employing a reflector or reflectors for remote displaying to enable quick visual recognition of indications.

The automotive display system shown in FIG. 7 comprises a display 13, such as a liquid crystal display or a fluorescent character display tube unit, disposed under the meter hood 12 of an instrument panel 13, a semitransparent mirror 14 disposed in the display area of the instrument panel 11, and another display for displaying images which can be superposed on the virtual image 15 of the image displayed on the display 13. An image displayed on the display 13 is projected on the semitransparent mirror 14 for the visual recognition of the virtual image 15 of the image displayed on the display 13. The virtual image 15 seems to be displayed behind the semitransparent mirror 14 at a distance corresponding to the distance between the semitransparent mirror 14 and the display 13 from the semitransparent mirror 14 to give the effect of remote displaying.

The automotive display system shown in FIG. 8 comprises a display 23 disposed within the hood 22 of an instrument panel 21, a reflector 26 disposed opposite to the display 23 to reflect rays emanated from the display 23, a semitransparent mirror 24 disposed so as to reflect rays reflected by the reflector 26 to enable the visual recognition of the virtual image 25 of an image displayed on the display 23, and another display 27 for displaying images which can be superposed on the virtual image 25. Since the optical distance traveled by the rays is greater than that of the automotive display system of FIG. 7, the effect of remote display of the automotive display system of FIG. 8 is greater than that of the automotive display system of FIG. 7.

The conventional automotive display system shown in FIG. 7 reflects the image only once by the semitransparent mirror 14 and hence the effect of remote displaying of the automotive display system is unsatisfactory. However, increasing the optical distance by increasing the number of reflections requires increase in space for forming a comparatively long optical path entailing increase in the size of the automotive display system.

SUMMARY OF THE INVENTION

Accordingly, it is an object of the present invention to provide an automotive display system employing reflectors for remote displaying, having a satisfactory effect of remote displaying and formed in a compact construction.

In one aspect of the present invention, an automotive display system comprises a display, a reflecting member disposed with its reflecting surface facing the display screen of the display, and a transmissive reflecting member disposed between the display and the reflecting member and capable of transmitting rays emanated from the display, and is characterized in that the transmissive reflecting member is disposed so that the optical path of rays incident on the reflecting surface of the reflecting member and that of rays reflected by the reflecting surface of the reflecting member coincide with each other or form a very small angle, and the reflecting surface of the transmissive reflecting member reflects the rays reflected by the reflecting surface of the reflecting member toward the driver sitting on the driver's seat.

Rays emanated from the display is transmitted through the transmissive reflecting member and fall on the reflecting surface of the reflecting member, and the rays reflected by the reflecting surface of the reflecting member is reflected by the reflecting surface of the transmissive reflecting member. Since the path of the rays falling on the reflecting surface of the reflecting member and that of the rays reflected by the reflecting surface of the reflecting mirror coincide with each other or form a very small angle, the path of the rays falling on the reflecting surface of the reflecting member and that of the rays reflected by the reflecting surface of the reflecting member travel are included in the substantially the same space, so that the automotive display system can be formed in a compact construction in a comparatively small space.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

First Embodiment

Figure 1:
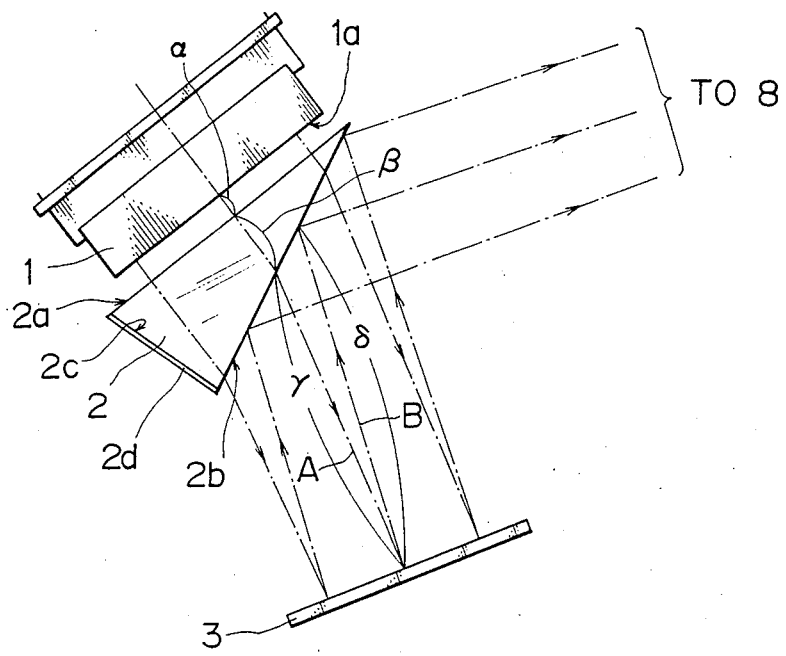
FIG. 1 is a diagrammatic view of an automotive display system in a first embodiment according to the present invention.
Figure 2:
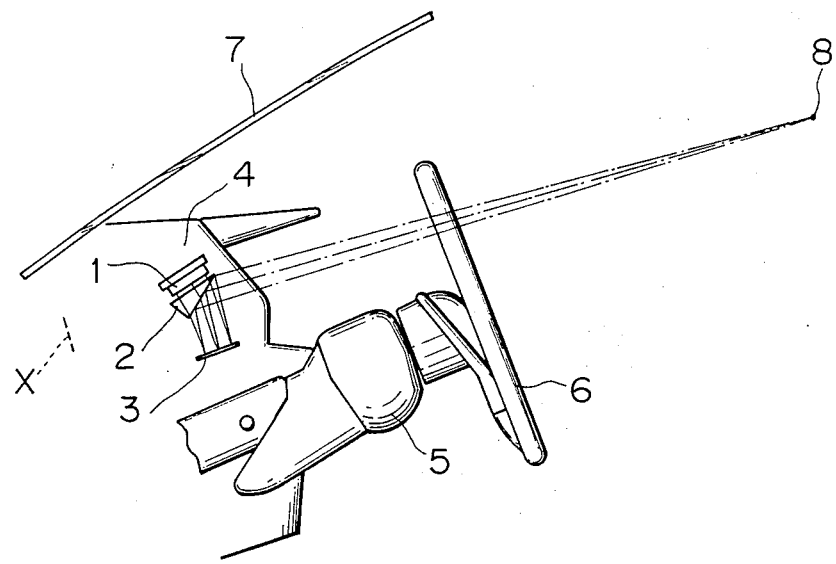
FIG. 2 is an illustration showing the disposition of the components of the automotive display system of FIG. 1 on a vehicle.

Referring to FIGS. 1 and 2, an automotive display system in a first embodiment according to the present invention comprises a display 1, such as a liquid crystal display or a fluorescent character display tube unit, a prism 2, i.e., a transmissive reflecting member, and a reflecting mirror 3, i.e., the reflecting member. The automotive display system is accommodated in an instrument panel 4. Also shown in FIG. 2 are a steering column 5, a steering wheel 6 and a windshield glass 7. A light ray emanated from the display 1 travels through the prism 2, falls on and reflected by the reflecting mirror 3, and the reflected light ray is reflected again by the reflecting surface of the prism 2 toward the driver's eye 8, so that the virtual image X of an image displayed on the display 1 is recognized at a position behind the prism 2. The prism 2 is disposed near the display screen 1a of the display 1, and the reflecting mirror 3 is disposed after the prism 2 with respect to the direction of travel of the light ray emanated from the display 1 at a distance from the prism 2 with its reflecting surface facing the display screen 1a of the display 1.

In FIG. 1, alternate long and short dash lines indicate the path of the light ray emanated from the display 1 and directed toward the driver's eye 8. The light ray emanated from the display 1 falls perpendicularly on the first surface 2a, namely, the plane of incidence, of the prism 2. The light ray incident on the prism 2 is refracted by the prism 2, leaves the second surface 2b, i.e., the reflecting plane, of the prism 2, travels along an optical path A, and then falls substantially perpendicularly on the reflecting mirror 3. The light ray reflected by the reflecting mirror 3 travels along an optical path B toward the second surface 2b of the prism 2. The optical paths A and B form a very small angle. Then, the reflected light ray is reflected again by the second surface 2b of the prism 2 and travels along an optical path C toward the driver's eye 8. The optical paths A and B may coincide with each other. Since the angle between the optical paths A and B is very small, the light ray travels from the second surface 2b to the reflecting mirror 3 and from the reflecting mirror 3 to the second surface 2b. Accordingly, the length of the optical path traveled by the light ray between the second surface 2b and the reflecting mirror 3 is approximately twice the distance between the second surface 2b and the reflecting mirror 3. Thus, the automotive display system has a long optical path in a relatively small space and hence the automotive display system can be formed in a compact construction.

The virtual image X which can visually be recognized from the driver's eye 8 is in an angular range including the second surface 2b of the prism 2 and the distance between the second surface 2b and the virtual image X is $\alpha+\beta+\gamma+\delta$ (FIG. 1).

The optical position of the virtual image X relative to the driver's eye 8 can easily be adjusted by adjusting the angle of the mirror 3 relative to the second surface 2a of the prism 2 with the display 1 and the prism 2 fixed to the instrument panel 4.

The positional relation between the driver's eye 8 and the prism 2, and the characteristics of the prism 2 will be described hereinafter.

Suppose that an imaginary light ray l is emitted from the driver's eye 8 toward the prism 2. Then, the optical path of the light ray l can be considered to be a line of sight extending from the driver's eye 8.

The angle $\theta$ between the first surface 2a and second surface 2b of the prism 2 is determined so that the light ray l is refracted in entering the prism 2 through the second surface 2b, and then the refracted light ray l undergoes total reflection on the first surface 2a within the prism 2, that is, the angle $\Psi$ is greater than the critical angle of total reflection on the first surface 2a. The light ray l undergone total reflection on the first surface 2a undergoes total reflection on the second surface 2b. Accordingly, when the second surface 2b is viewed from the direction of travel of the light ray l, namely, from the driver's eye 8, the display screen 1a of the display 1 can not directly be seen through the prism 2. Therefore, the prism 2 can be disposed as near as possible to the display 1 and thereby the distance between the prism 2 and the mirror 3 can be increased accordingly increasing the effect of remote displaying.

When the prism 2 is seen in the direction of travel of the light ray l, the third surface 2c of the prism 2 can be seen. However, since the third surface 2c is painted black, the remote-displayed virtual image X of the image displayed on the display 1 is contrasted by the dark third surface 2c.

Similarly to the effect of the total reflection of the light ray l in the prism 2, a light ray entered the prism 2 through the second surface 2b is unable to reach the display 1, and hence the washout of the image displayed on the display 1 due to external light does not occur.

Figure 4:
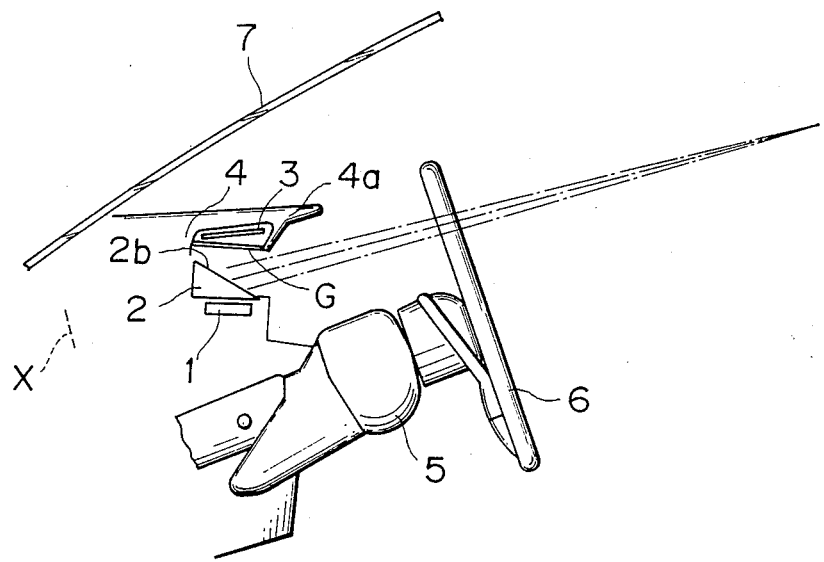
FIG. 4 is a diagrammatic view of assistance in explaining another disposition of the components of the automotive display system of FIG. 1 on a vehicle.

FIG. 4 shows another disposition of the components of the automotive display system, in which parts corresponding to those shown in FIG. 2 are denoted by the same reference characters. In this disposition, the display 1 is disposed in the instrument panel 4 with its display screen 1a facing up, the prism 2 is disposed over the display 1 with a small distance therebetween and with the second surface 2b declining toward the driver's seat, and the reflecting mirror 3 is disposed within the meter hood 4a extending from the upper end of the instrument panel 4. Such disposition of the prism 2 facilitates cleaning the second surface 2b of the prism 2. The reflecting mirror 3, which is shielded from external light, may be covered with a glass plate G for protection.

Second Embodiment

Figure 5:
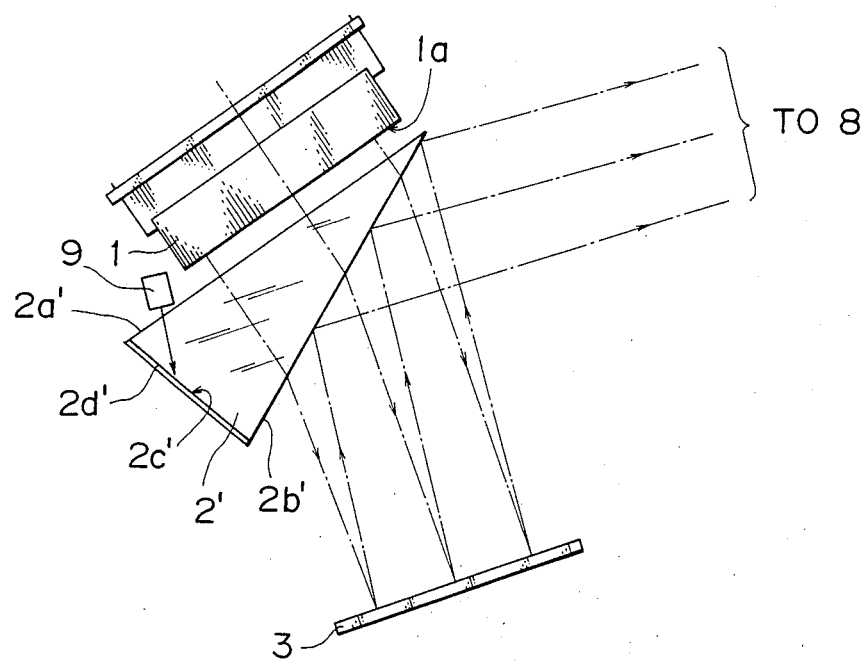
FIG. 5 is a diagrammatic view of an automotive display system in a second embodiment according to the present invention.
Figure 7:
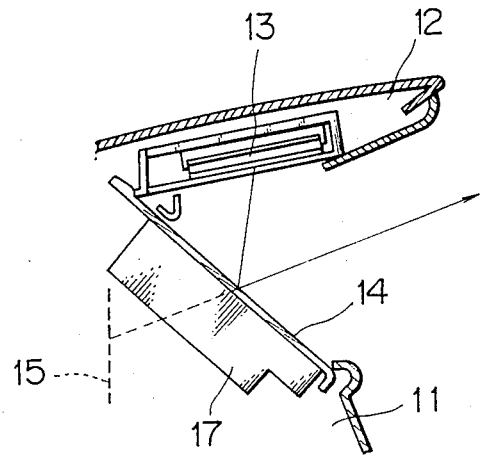
FIGS. 7 and 8 are diagrammatic views of conventional automotive display system employing a reflector or reflectors.
Figure 8:
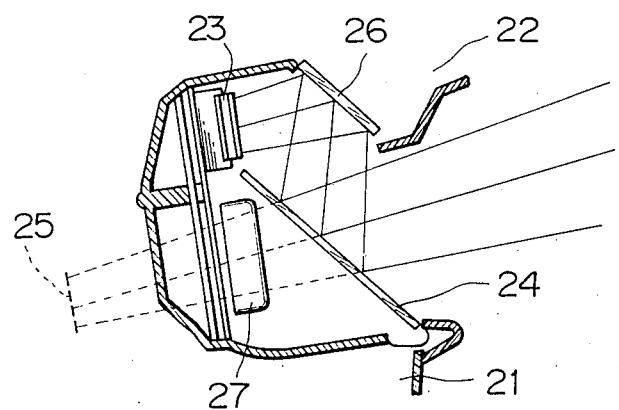

FIG. 5 shows an automotive display system in a second embodiment according to the present invention, in which parts like or corresponding to those previously described with reference to FIG. 1 are denoted by the same reference characters.

Figure 3:
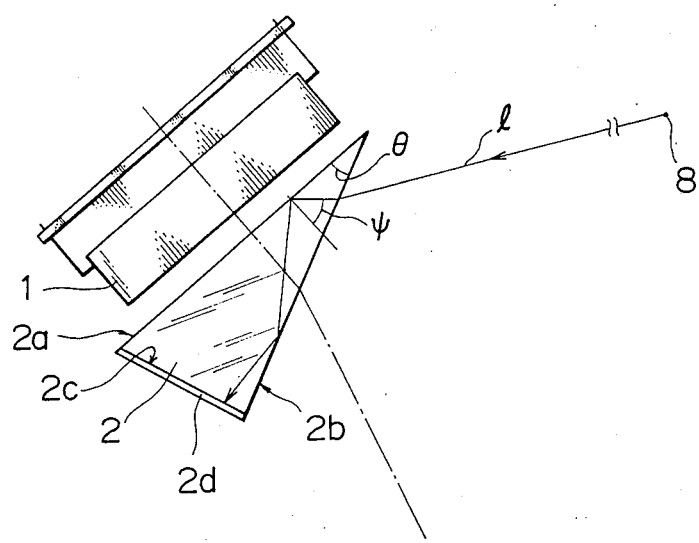
FIG. 3 is a diagrammatic view of assistance in explaining the function of a prism employed in the automotive display system of FIG. 1.
Figure 6:
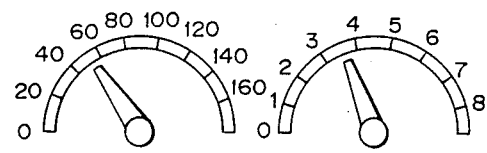
FIG. 6 is an illustration of luminous scales.

A light ray emanated from a display 1 is transmitted through a prism 2', falls on and reflected by a reflecting mirror 3, and the reflected light ray is reflected again by the second surface 2b' of the prism 2' toward the driver's eye 8, so that the virtual image of an image displayed on the display screen 1a of the display 1 can be recognized within a range corresponding to the second surface 2b'. As stated above with reference to FIG. 3, the display 1 can not directly be seen through the first surface 2a' from the driver's eye 8. The third surface 2c' of the prism 2' is coated with a luminescent layer 2d' which becomes luminous when irradiated by ultraviolet rays, and an ultraviolet lamp 9 is disposed beside the display 1 near the first surface 2a' of the prism 2' to irradiate the luminescent layer 2d' by ultraviolet rays. The color of the luminescent layer 2d' is, for example, dark blue when not irradiated by ultraviolet rays and becomes, for example, sky blue when irradiated. The luminescent layer 2d' may be formed of, for example, a ultraviolet-reactive coloring fibers, such as "SWAY UV" (Toray K.K.). The virtual image may be displayed on a dark background without irradiating the luminescent layer 2d' by ultraviolet rays or may be displayed on a colored background by irradiating the luminescent layer 2d' by ultraviolet rays. The luminescent layer 2d' need not necessarily become luminous in a solid color, but may become luminous in locally different colors, or in a colored pattern. A luminescent pattern, such as scales as shown in FIG. 6, may be formed on the third surface 2c' of the prism 2' instead of the luminous layer 2d' to display a luminous pattern on the third surface 2c'.

Although the invention has been described in its preferred forms with a certain degree of particularity, obviously many changes and variations are possible therein.

It is therefore to be understood that the present invention may be practiced otherwise than as specifically described herein without departing from the scope and spirit thereof.

What is claimed is:

1. An automotive display system for a vehicle, comprising:
   a display screen;
   a reflecting member having a first reflecting surface opposite the display screen of the display; and
   a transmissive reflecting member disposed between the display and the reflecting member and having a surface of incidence for receiving light rays emanated from the display, and a second reflecting surface facing said first reflecting surface;
   characterized in that the transmissive reflecting member is disposed so that the optical path of the light rays transmitted through the transmissive reflecting member and traveling to the first reflecting surface of the reflecting member and the optical path of the light rays reflected by the first reflecting surface of the reflecting member coincide with each other or form a very small angle therebetween, and the light rays reflected by the first reflecting surface of the reflecting member is reflected again by the second reflecting surface of the transmissive reflecting member toward the driver's seat.

2. An automotive display system for a vehicle according to claim 1, wherein the transmissive reflecting member is a prism, a first surface among the surfaces of the prism is used as the surface of incidence facing the display screen of the display, a second surface among the surfaces of the prism is used as the second reflecting surface, and the angle between the first and second surfaces is determined so that imaginary light rays incident on the second surface along the path of travel of the light rays reflected by the second surface undergoes total reflection on the first surface within the prism.

3. An automotive display system for a vehicle according to claim 2, wherein the surfaces of the prism other than the first and second surfaces are finished in a dark color.

4. An automotive display system for a vehicle according to claim 2, wherein the surfaces of the prism other than the first and second surfaces become luminous in a color selected as the color of the background of indications.

* * * * *